US012804273B2

(12) United States Patent
(10) Patent No.: US 12,804,273 B2
(45) Date of Patent: Nov. 17, 2026

Fang et al.

(54) METHOD FOR IMAGE PROCESSING INCLUDING LENS SHADING AND WEIGHTED MASKING AND AN ELECTRONIC DEVICE PERFORMING THE SAME

(71) Applicant: SAMSUNG ELECTRONICS CO., LTD., Suwon-si (KR)

(72) Inventors: Jingyu Fang, Suzhou (CN); Liwei Yang, Suzhou (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 18/795,354

(22) Filed: Aug. 6, 2024

(65) Prior Publication Data

US 2025/0106528 A1 Mar. 27, 2025

(30) Foreign Application Priority Data

Sep. 22, 2023 (CN) ......................... 202311227530.5

(51) Int. Cl.
*H04N 5/335* (2011.01)
*H04N 23/88* (2023.01)

(52) U.S. Cl.
CPC .................................... *H04N 23/88* (2023.01)

(58) Field of Classification Search
CPC ...................................................... H04N 23/88
See application file for complete search history.

(56) References Cited

U.S. PATENT DOCUMENTS 9,361,537 B2 6/2016 Paliy et al.
9,367,916 B1 6/2016 Paliy et al.
9,479,708 B2 10/2016 Yamada et al.
10,542,243 B2 1/2020 Krestyannikov et al.
10,855,964 B2 * 12/2020 Cao ........................ H04N 23/80
11,082,675 B2 8/2021 Paliy
2010/0085447 A1 * 4/2010 Kanemitsu ............. H04N 25/61 348/E5.079
2015/0029359 A1 * 1/2015 Nenonen .............. H04N 1/6077 348/224.1
2021/0192742 A1 6/2021 Chou et al.
2022/0124292 A1 4/2022 Paliy

FOREIGN PATENT DOCUMENTS

CN 101715049 A 5/2010
CN 103051905 A 4/2013
CN 107623816 A 1/2018
CN 111492645 A 8/2020
CN 115442515 A 12/2022
KR 10-2011-0072213 A 6/2011

OTHER PUBLICATIONS

First Office Action issued Jun. 19, 2026 in corresponding Chinese Patent Application No. 202311227530.5.

* cited by examiner

*Primary Examiner* — Gary C Vieaux
(74) *Attorney, Agent, or Firm* — Morgan, Lewis & Bockius LLP

(57) ABSTRACT

A method for image processing including: obtaining a sensor image; performing a lens shading correction on the sensor image to obtain a first image; performing a weighted masking on the first image to obtain a second image; and performing an automatic white balance processing on the second image to obtain a third image.

19 Claims, 8 Drawing Sheets

METHOD FOR IMAGE PROCESSING INCLUDING LENS SHADING AND WEIGHTED MASKING AND AN ELECTRONIC DEVICE PERFORMING THE SAME

CROSS-REFERENCE TO RELATED APPLICATION

This application claims priority under 35 U.S.C. § 119 to Chinese Patent Application No. 202311227530.5, filed on Sep. 22, 2023, the disclosure of which is incorporated by reference herein in its entirety.

TECHNICAL FIELD

Some example embodiments of the inventive concept relate to the field of image processing, and more particularly, to image processing methods and/or electronic devices designed to increase the speed of camera stream (or image stream) processing.

DISCUSSION OF RELATED ART

Original images captured by an image sensor undergo various image processing steps including Lens Shading Correction (LSC), Automatic White Balance (AWB) and the like. The LSC processing and the AWB processing interact with each other. In other words, these two processes are interdependent. Generally, the LSC gain for a current image frame depends on a Correlated Color Temperature (CCT) determined by the AWB processing of the previous image frame. In turn, the LSC gain for the current image frame influences a result of the AWB processing for the current image frame, which subsequently impacts the LSC processing of a next image frame.

When processing an image stream which includes a plurality of sensor images, CCT used in previous image processing steps may not be applicable if there is a change in illumination or the image sensor itself. In such cases, achieving a stable CCT may require iterative processing on several image frames, which can lead to extended processing times.

Therefore, there is a need for an image processing method to improve the speed of camera stream processing.

SUMMARY

According to some example embodiments of the inventive concept, there is provided a method for image processing including: obtaining a sensor image; performing a lens shading correction on the sensor image to obtain a first image; performing a weighted masking on the first image to obtain a second image; and performing an automatic white balance processing on the second image to obtain a third image.

According to some example embodiments of the inventive concept, there is provided an electronic device including: a sensor module configured to obtain sensor images; and a processor configured to, perform a lens shading correction on the sensor image to obtain a first image; perform a weighted masking on the first image to obtain a second image; and perform an automatic white balance processing on the second image to obtain a third image.

According to some example embodiments of the inventive concept, there is provided a non-transitory computer-readable storage medium stores instructions that, when executed by a processor, cause the processor to execute the method disclosed above.

The method of image processing and an electronic device according to some example embodiments of the inventive concept, may perform a weighted masking processing between the lens shading correction processing and the automatic white balance processing when the light source changes or the imaging sensor changes. This way, a converged correlated color temperature may be obtained by using fewer images, thereby increasing the speed of camera stream processing.

BRIEF DESCRIPTION OF THE DRAWINGS

The above and other features of the inventive concept will become clearer through the following detailed description taken together with the accompanying drawings in which.

DETAILED DESCRIPTION OF EXAMPLE EMBODIMENTS

Example embodiments of the inventive concept will be described hereinafter with reference to the accompanying drawings. However, various changes and modifications to the methods, apparatuses, and/or systems described herein will be apparent to one of ordinary skill in the art. For example, the sequences of operations described herein are merely examples, and are not intended to be limited to those set forth herein, but may be changed as determined by one of ordinary skill in the art.

Although the terms “first” or “second” may be used to explain various components, the components are not limited by the terms. These terms are merely used to distinguish one component from another component. For example, a “first” component may be referred to as a “second” component, or similarly, the “second” component may be referred to as the “first” component.

It will be understood that when a component is referred to as being “connected to” another component, the component may be directly connected or coupled to the other component or intervening components may be present.

As used herein, the singular forms “a”, “an”, and “the” are intended to include the plural forms as well, unless the context clearly indicates otherwise. It should be further understood that the terms “comprises” and/or “comprising,” when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical or scientific terms used herein have the same meaning as commonly understood by one of ordinary skill in the art to which this invention pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
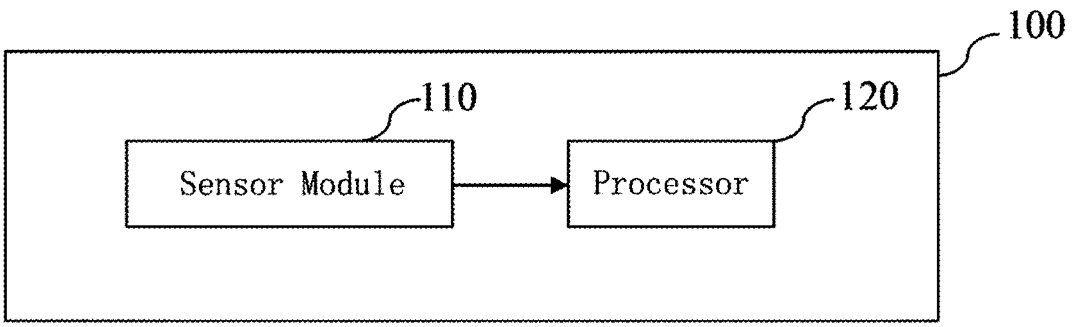
FIG. 1 is a block diagram illustrating an electronic device according to some example embodiments of the inventive concept.

FIG. 1 is a block diagram illustrating an electronic device according to some example embodiments of the inventive concept.

The electronic device according to various example embodiments of the present inventive concept may include or may be, for example, at least one of a camera, a mobile phone, a tablet personal computer (PC), a personal digital assistant (PDA), a portable multimedia player (PMP), an augmented reality (AR) device, a virtual reality (VR) device, various wearable devices (e.g., a smart watch, smart glasses, a smart bracelet, etc.). However, example embodiments are not limited thereto, and the electronic device according to the present inventive concept may be any electronic device having an image processing function.

As shown in FIG. 1, the electronic device 100 according to some example embodiments at least includes a sensor module 110 and a processor 120. In addition, the electronic device 100 may further include a memory unit.

The sensor module 110 may capture an object and generate a plurality of sensor images. The sensor images output from the sensor module are also called raw images.

The processor 120 may receive the sensor images from the sensor module 110, and perform image processing on the sensor images. The processor 120 may perform various operations on the sensor images, including pre-processing, lens shading correction (LSC), automatic white balance (AWB), and other post-processing tasks. Although various processing performed on the images by the processor 120 are shown herein, these are merely examples, and the present inventive concept is not limited thereto.

According to example embodiments, the processor 120 may obtain a sensor image; performing a lens shading correction on the sensor image, to obtain a first image; perform a weighted masking on the first image, to obtain a second image; and perform an automatic white balance on the second image, to obtain a third image.

The memory unit may obtain images from the outside or receive images generated by the sensor module 110. The memory unit may store images used to perform image processing tasks.

The memory unit may also store data and/or software or instructions for implementing a method of image processing according to some example embodiments. When the processor 120 executes the software or instructions, the method of image processing according to some example embodiments may be implemented. The memory may be implemented as a part of the processor 120 or separately from the processor 120 within the electronic device 100.

The processor 120 may be implemented as a general-purpose processor, an application processor (AP), an integrated circuit dedicated to image processing, a field programmable gate array, or a combination of hardware and software.

Figure 2:
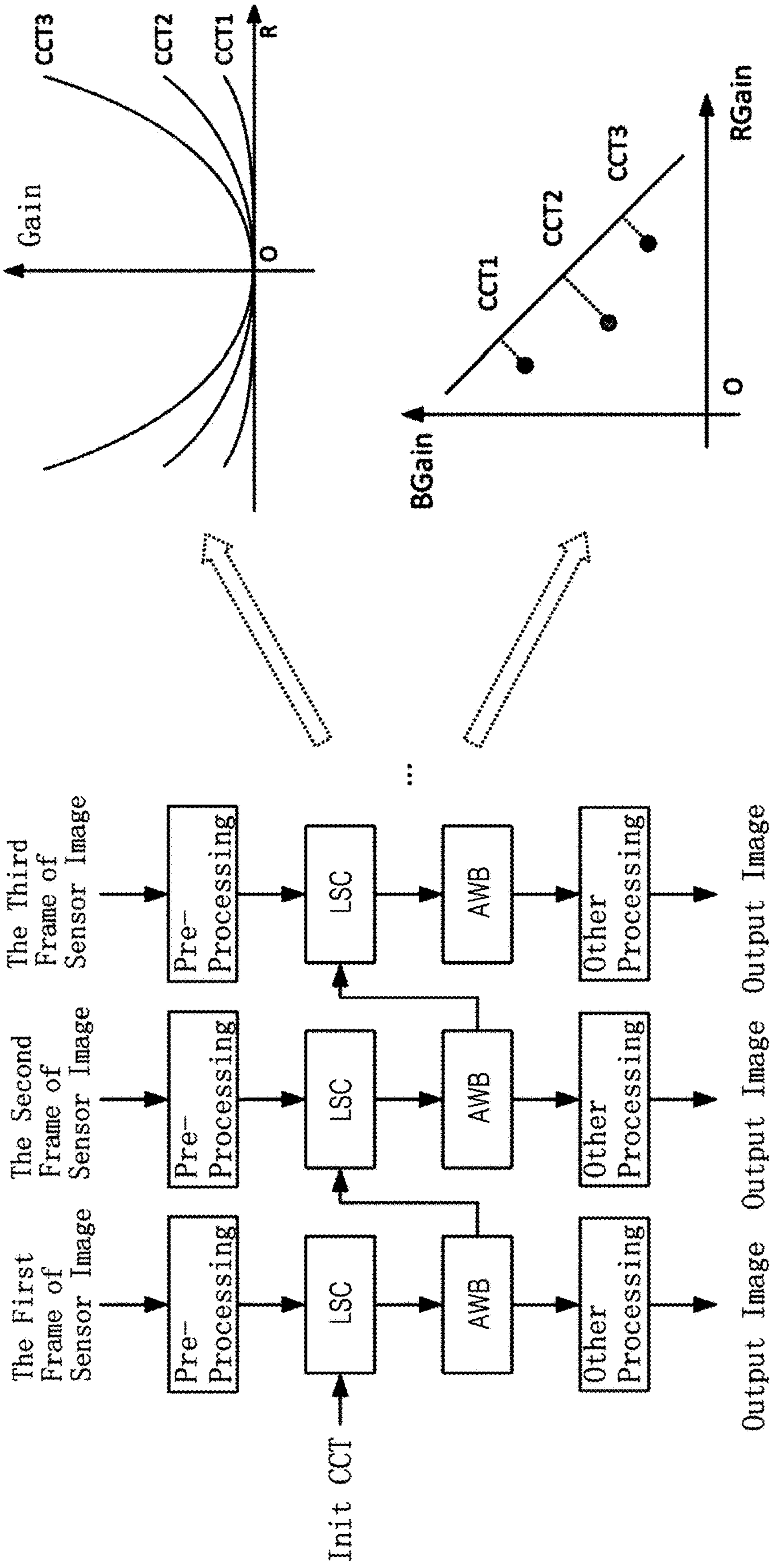
FIG. 2 is a diagram illustrating an example of processing an image stream.

FIG. 2 is a diagram illustrating an example of processing an image stream.

Referring to FIG. 2, the processor 120 may perform various operations on the sensor image such as, the pre-processing, the lens shading correction (LSC), the automatic white balance (AWB), and other post-processing tasks to produce an output image.

According to some example embodiments, the pre-processing steps may include the removal of dark current, linear correction, bad point compensation, among other tasks. The LSC refers to correcting the pixels around the field of view according to the physical characteristics of a lens, such that the brightness of an image is consistent. The gain of LSC is associated with the correlated color temperature (CCT) of the image. AWB involves calculating the gain of RGB (red, green and blue) channels as well as determining the CCT of the captured scene, based on the scene's color statistical information. Other processing after AWB may include the removal of noise, sharpness enhancement, gamut mapping, etc. Although various image processing operations may be performed on the image, there are merely examples, and the present inventive concept is not limited thereto.

The sensor module 110 may capture a plurality of sensor images which are continuous or consecutive (for example, a plurality of frames of sensor images), and the processor 120 may sequentially perform the pre-processing, LSC, AWB and other processing for each sensor image.

The right side of FIG. 2 shows a relationship between LSC processing and AWB processing. The upper portion on the right side of FIG. 2 shows the influence of CCT on LSC gain in the LSC processing, where the horizontal axis R represents a distance from the pixel of an imaging plane to the center point of the imaging plane, and the vertical axis represents the LSC gain. The lower portion on the right side of FIG. 2 shows that during the AWB processing, R channel gain RGain and B channel gain BGain are obtained based on the result of the LSC processing, and thus, the CCT is calculated based on the RGain and the BGain. As can be seen from FIG. 2, different LSC gains may be obtained based on different CCT values (for example, CCT1, CCT2 and CCT3). In addition, the results of the LSC processing directly affect the channel gain (for example, the RGain and the BGain) in the AWB processing, thus affecting the calculation of the CCT value.

In an example, the LSC processing of the first frame of the sensor image is based on the initial CCT. A CCT obtained based on the AWB processing of the first frame of the sensor image may be used as a CCT estimation value of the second frame of the sensor image and used for the LSC processing of the second frame of the sensor image. By iteratively performing, on a plurality of sensor images, the image processing shown in FIG. 2, a convergent (or stable) CCT may be obtained.

When the illumination scene changes or the imaging sensor changes, the CCT used in the previous image processing step may no longer be applicable to the current scene. In this case, iterative processing is performed on several frames of images to obtain the CCT that converges to a stable state. This, however, can lead to extended processing times.

Hereinafter, a method for image processing according to example embodiments of the present disclosure will be described with reference to FIGS. 3 to 5.

Figure 3:
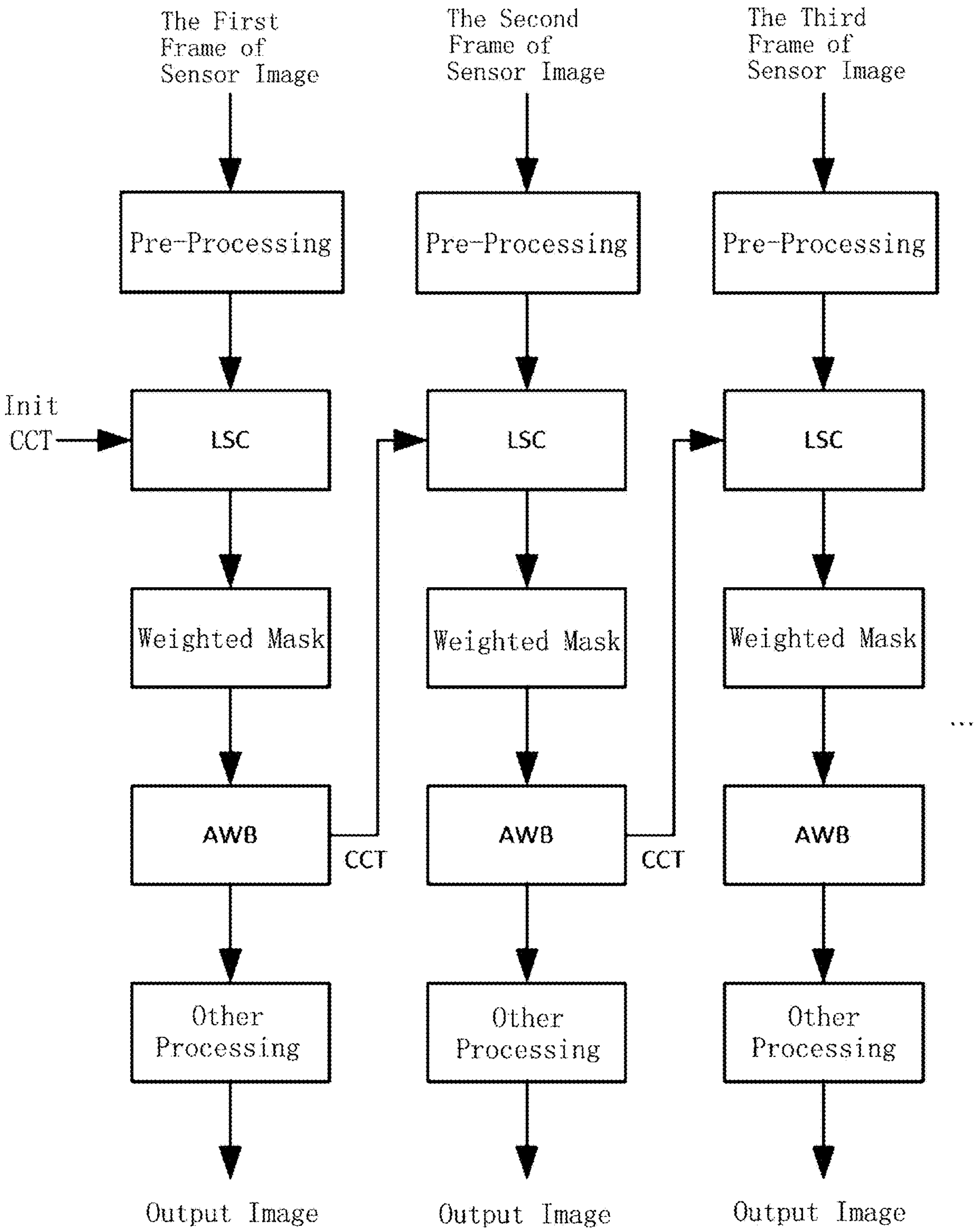
FIG. 3 is a diagram illustrating an example of processing an image stream according to some example embodiments of the inventive concept.

FIG. 3 is a diagram illustrating an example of processing an image stream according to some example embodiments.

Referring to FIG. 3, unlike the processing of the image stream shown in FIG. 2, there is a weighted masking processing between the LSC processing and the AWB processing.

Generally, when calculating the LSC gain based on the CCT, an error in the CCT will cause larger LSC gain error at the corners or peripheral pixels of the image. This is due to a more noticeable lens shadow in the corners. Conversely, errors of the CCT have a lesser influence on the LSC gain at the central pixels of the image. In other words, the wrong CCT has little influence on the pixels located in the center of the image. Because the calculation of AWB is not sensitive to corner pixels, when the CCT is calculated by performing the AWB processing based on the result of the LSC processing, the influence of pixels located at the corners of the image may be properly masked.

The weighted masking processing may be triggered based on various conditions. For example, when the light source of the scene used to capture the images changes, or the image sensor used for imaging changes, the weighted masking processing may be triggered (e.g., may be executed).

Determining whether to trigger the weighted masking processing may be based on the difference between the CCT values of two adjacent frames of images. For example, when the difference between the CCT values of two adjacent frames of images is greater than a predetermined threshold, it may be determined that the image is in a transitional state. At this time, a weighted masking processing may be performed, using a weighted mask, on the image which has experienced the LSC processing. Hereinafter, the weighted masking processing is described in detail with reference to FIGS. 4, 5, 6A and 6B.

Figure 4:
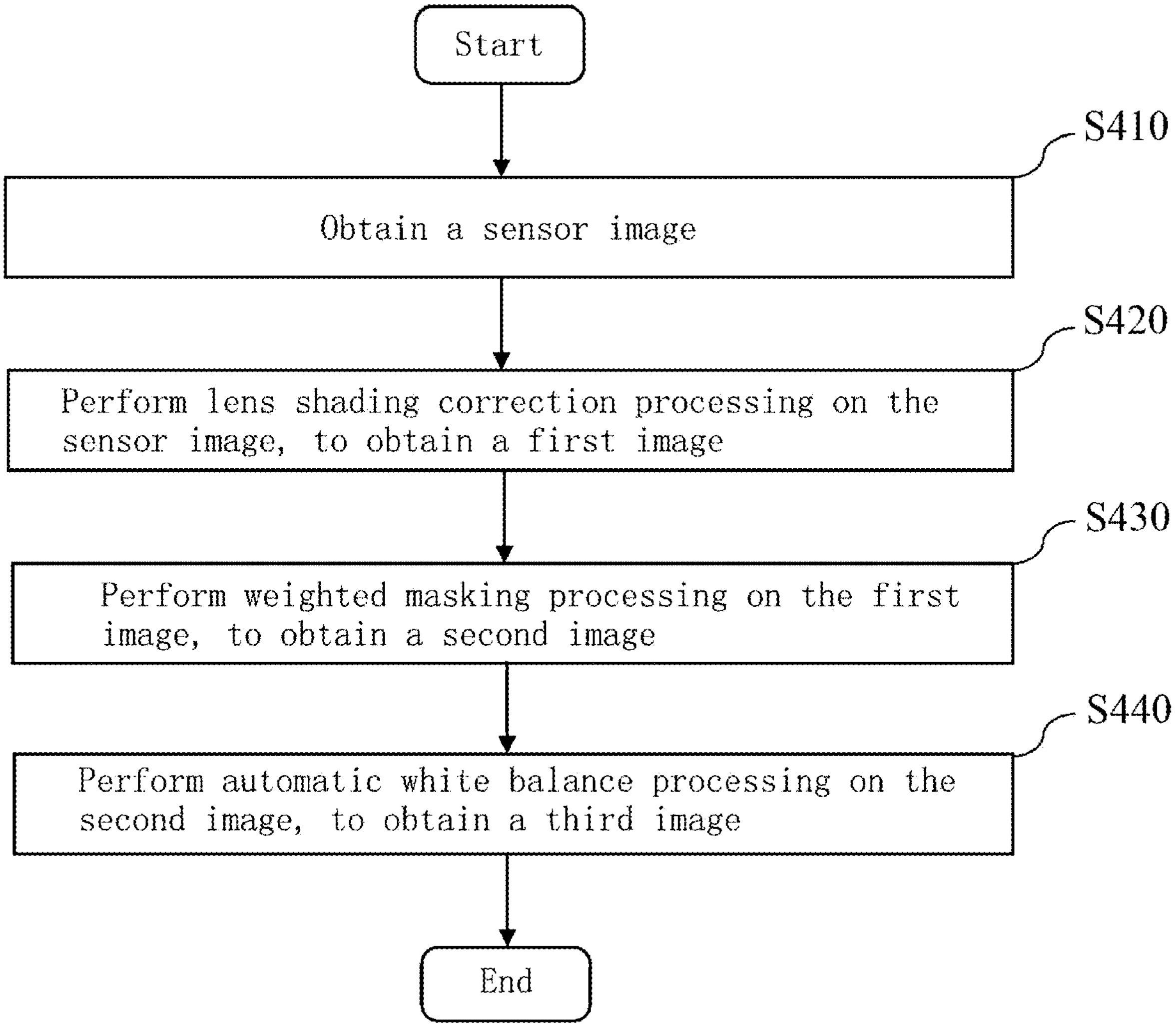
FIG. 4 is a flowchart illustrating an image processing method according to some example embodiments of the inventive concept.

FIG. 4 is a flowchart illustrating an image processing method according to some example embodiments. Although FIG. 4 shows various steps, the order of the steps is not necessarily limited to that shown in FIG. 4.

Referring to FIG. 4, at step S410, the processor 120 may obtain a sensor image. For example, the processor 120 may receive a sensor image from the sensor module 110, or from outside the electronic device 100. The sensor image obtained by the processor 120 may include a plurality (or a plurality of frames) of sensor images captured in sequence.

In some example embodiments, an image, on which the lens shading correction processing is to be performed, may be referred to as the sensor image. In other words, the pre-processing (e.g., the removal of dark current, linear correction, bad point compensation, etc.) may be performed on the captured image before the lens shading correction processing is performed.

At step S420, the processor 120 may perform the lens shading correction processing on the sensor image, to obtain a first image.

At step S430, the processor 120 may perform the weighted masking processing on the first image to obtain a second image.

At step S440, the processor 120 may perform the automatic white balance processing on the second image to obtain a third image.

The processor 120 may perform the lens shading correction processing, the weighted masking processing and the automatic white balance processing on each of the sensor images obtained, so as to obtain respective first images, respective second images and respective third images corresponding to respective ones of the sensor images.

Referring to FIG. 3, the lens shading correction processing performed on the current sensor image is based on the CCT of a third image corresponding to the previous sensor image. For example, the LSC processing on the first frame of sensor image may be based on the initial CCT value, the LSC processing on the second frame of sensor image may be based on the CCT obtained through the AWB processing on the first frame of sensor image, and the LSC processing of the third frame of sensor image may be based on the CCT obtained through the AWB processing of the second frame of sensor image.

The method for image processing according to example embodiments of the inventive concept may increase the speed of camera stream processing by performing the weighted masking processing between the lens shading correction processing and the automatic white balance processing when the light source changes or the imaging sensor changes, such that a converged CCT (for example, a CCT corresponding to the changed image capture environment) may be obtained through a smaller number of images.

Figure 5:
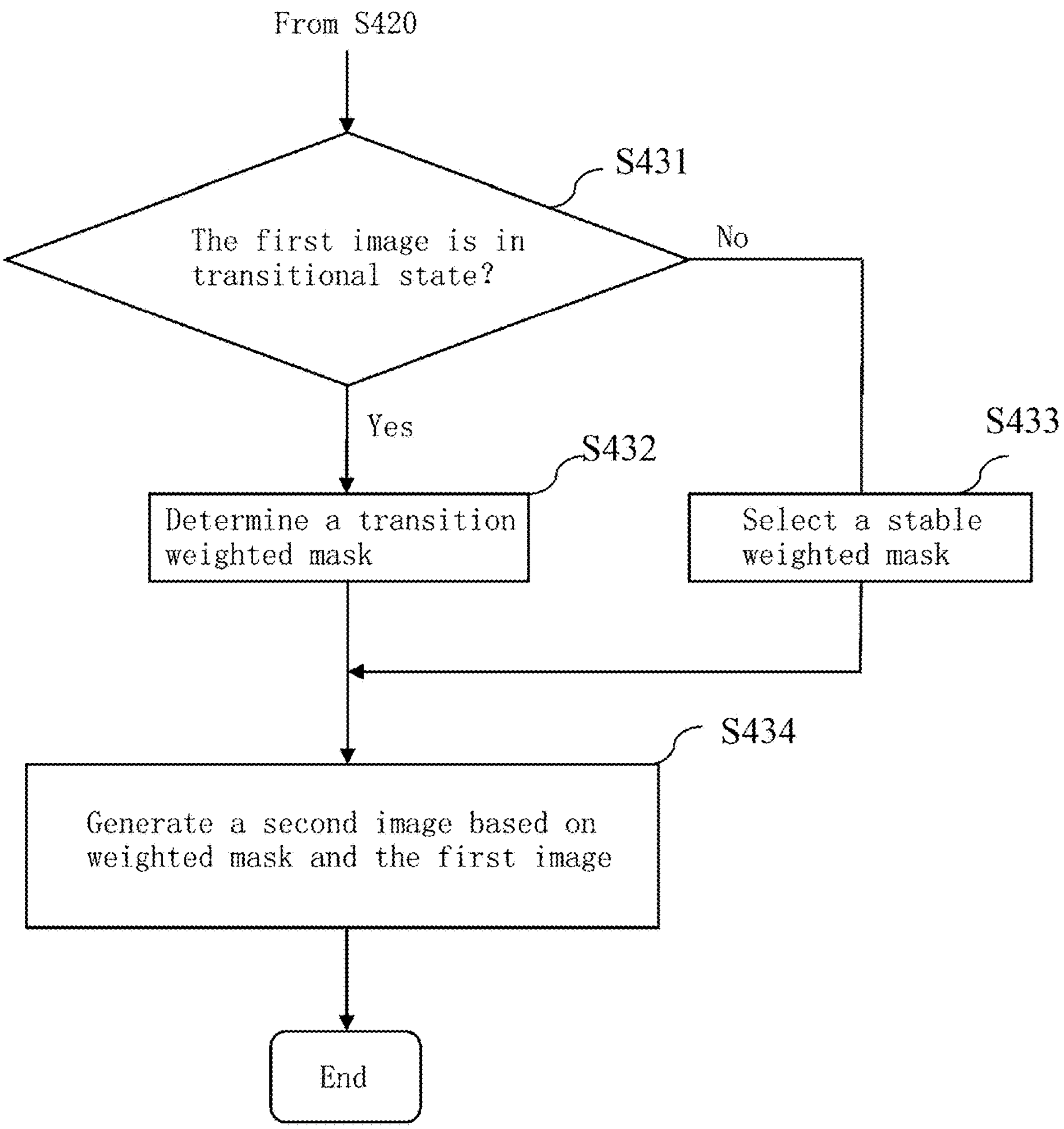
FIG. 5 is a flowchart illustrating a weighted masking processing according to some example embodiments of the inventive concept.

FIG. 5 is a flowchart illustrating the weighted masking processing according to some example embodiments. The steps in FIG. 5 may correspond to step S430 in FIG. 4. Although FIG. 5 shows various steps, the order of the steps is not necessarily limited to that shown in FIG. 5.

Referring to FIG. 5, whether the first image is in a transitional state may be determined at step S431.

According to some example embodiments, whether the first image (for example, the first image corresponding to the current sensor image) is in the transitional state may be determined based on whether the difference of CCT estimated values between the first image corresponding to the current sensor image and the first image corresponding to the previous sensor image is greater than a predetermined threshold. In this case, the CCT estimated value of the first image corresponding to the current sensor image may be the CCT of the third image corresponding to the previous sensor image.

In response to the difference of CCT estimated values between the first image for the current sensor image and the first image for the previous sensor image being greater than the threshold, it may be determined that the first image corresponding to the current sensor image is in a transitional state (YES in S431). Therefore, at step S432, a transition weighted mask may be determined.

In response to the difference being not greater than the threshold, it may be determined that the first image corresponding to the current sensor image is in a stable state (No in S431). Therefore, a stable weighted mask may be selected at step S433.

At step S434, a second image may be generated based on the weighted mask and the first image.

According to example embodiments, the weighted mask may include a plurality of weights, each of which corresponds to one of a plurality of pixels in the first image. Each of pixel values of the second image may be calculated based on a respective weight among the weights in the weighted mask and a pixel value of a respective pixel in the first image. For example, each of the pixel values of the second image may be obtained by multiplying a respective weight in the weighted mask with the pixel value of a corresponding pixel in the first image. The pixel values of the second image may be used for subsequent AWB processing.

In response to determining that the first image is in the stable state, the stable weighted mask may be selected. In the stable weighted mask, the value of each of the weights is 1.

In response to determining that the first image is in the transitional state, the transitional weighted mask may be determined. In the transitional weighted mask, the value of each of the weights ranges from 0 to 1.

The LSC gain error due to a wrong CCT has less influence on the pixels located in the central position of the image. Therefore, in the transition weighted mask, a value of the weight corresponding to a pixel located in the central position of the image may be large, and a value of the weight corresponding to a pixel located in the peripheral position of the image may be small.

Figure 6A:
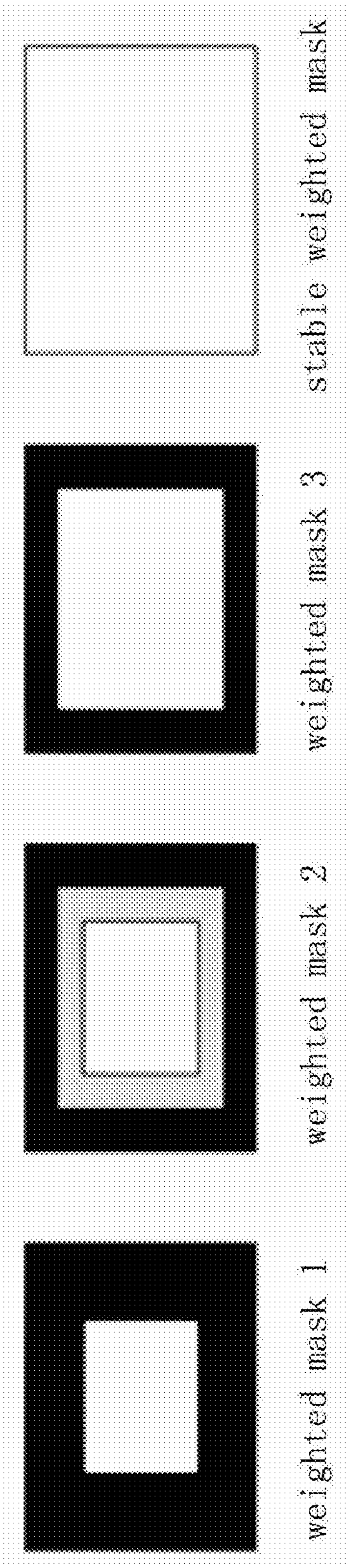
FIGS. 6A and 6B illustrate examples of transition weighted masks according to some example embodiments of the inventive concept.
Figure 6B:
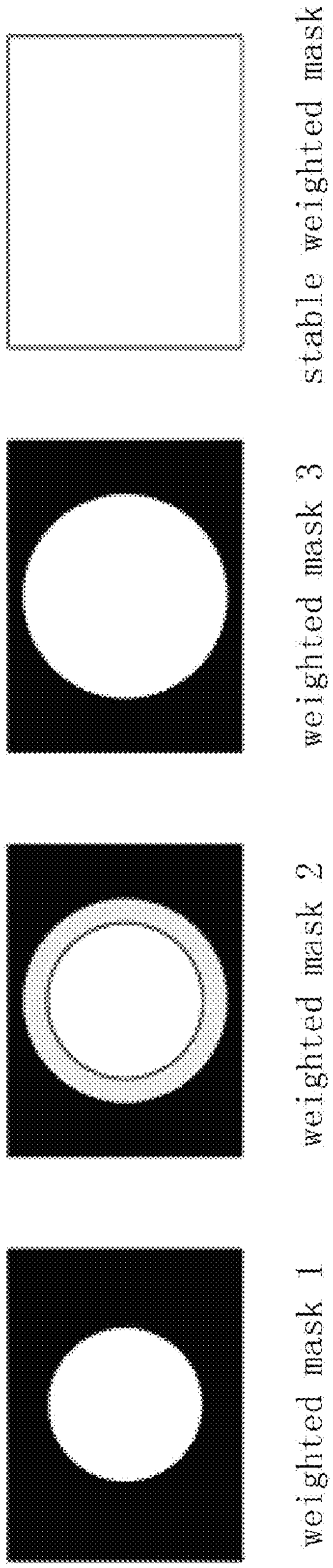

FIGS. 6A and 6B illustrate examples of transition weighted masks according to some example embodiments.

According to an example embodiment, in response to the first image being in the transitional state, transition weighted masks may be sequentially selected from a predetermined set of weighted masks. The selected transition weighted mask may be used for each of a plurality of consecutive or continuous first images, and a transition weighted mask of the first image corresponding to the current sensor image may be different from that of the first image corresponding to the previous sensor image.

FIGS. 6A and 6B illustrate sets of weighted masks including a plurality of weighted masks, respectively. Referring to FIGS. 6A and 6B, each of the weighted masks includes a plurality of weights corresponding to pixels of the first image. In FIGS. 6A and 6B, a black portion indicates that the weight value is 0 (in other words, all pixels corresponding to the black region are masked), the white portion indicates that the weight value is 1, and the gray portion indicates that the weight value is between 0 and 1. As can be seen, in the transition weighted masks, the corners or edges have the weight value of 0. Although the sets of weighted masks illustrated in FIGS. 6A and 6B include three transition weighted masks and one stable weighted mask, this is only an example, and the present inventive concept is not limited thereto. For example, the number of weighted masks included in the set of weighted masks and the weight values in the weighted masks may be changed variously.

For example, in response to a previous first image being in the stable state and the current first image being in the transitional state, a first weighted mask may be selected from the sets of weighted masks in FIG. 6A or 6B, to perform the weighted masking processing on the current first image. Then, a second weighted mask may be selected for a next first image, and a third weighted mask and a stable weighted mask may be selected for subsequent first images, respectively. Referring to FIGS. 6A and 6B, as the weighted masks gradually change from the first weighted mask to the stable weighted mask, the weights corresponding to the peripheral pixels in the first image gradually increase until all the weights become 1.

In another example, the weighted mask may be determined according to the difference of estimated CCT values between the first image corresponding to the current sensor image and the first image corresponding to the previous sensor image.

For example, a plurality of weighted masks, which correspond to different differences of CCTs respectively, may be determined in advance. When the difference of estimated CCT values between two first images is obtained at step S431, a weighted mask corresponding to the determined difference may be selected at step S432. In one example, the greater the difference in the estimated CCT values, the smaller the weight assigned to the peripheral pixels in the weighted mask.

Figure 7:
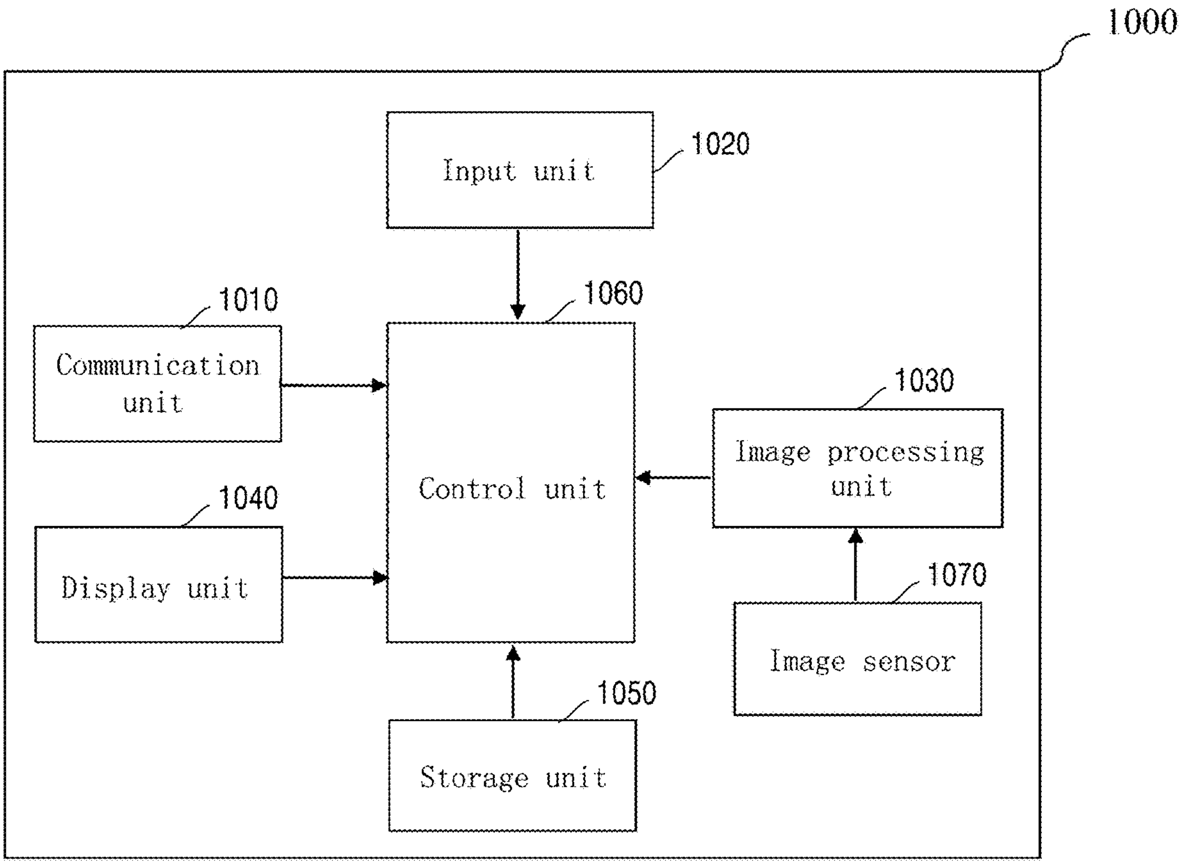
FIG. 7 illustrates a block diagram of a mobile terminal according to some example embodiments of the inventive concept.

FIG. 7 illustrates a block diagram of a mobile terminal according to some example embodiments.

As shown in FIG. 7, the mobile terminal 1000 according to some example embodiments includes a communication unit 1010, an input unit 1020, an image processing unit 1030, a display unit 1040, a storage unit 1050, a control unit 1060, and an image sensor 1070.

The communication unit 1010 may perform a communication operation of the mobile terminal 1000. The communication unit 1010 may establish a communication channel to the communication network and/or may perform a communication associated with, for example, a voice call, a video call, and/or a data call.

The input unit 1020 is configured to receive various input information and various control signals, and to transmit the input information and control signals to the control unit 1060. The input unit 1020 may be realized by various input devices such as keypads and/or key boards, touch screens and/or styluses, mice, etc. However, example embodiments are not limited thereto.

The image processing unit 1030 is connected to the image sensor 1070. The image sensor 1070 may capture images and transmit the captured images to the image processing unit 1030. The image processing unit 1030 may perform image processing on the images (for example, using the method of image processing illustrated in FIG. 4), and transmit the image processing result to the control unit 1060. The control unit 1060 may transmit the image processing result via the communication unit 1010 and/or may store the image processing result in the storage unit 1050. The image processing unit 1030 may be similar to the image processor 120 of FIG. 1.

The display unit 1040 is used to display various information, and may be realized, for example, by a touch screen. However, example embodiments are not limited thereto.

The storage unit 1050 may include volatile memory and/or nonvolatile memory. The storage unit 1050 may store various data generated and used by the mobile terminal 1000. For example, the storage unit 1050 may store an operating system and applications (e.g., applications associated with the methods according to example embodiments of the inventive concept) for controlling the operation of the mobile terminal 1000. The control unit 1060 may control the overall operation of the mobile terminal 1000 and may control part or all of the internal elements of the mobile terminal 1000. The control unit 1060 may be implemented as a general-purpose processor, an application processor (AP), an application specific integrated circuit, a field programmable gate array, etc., but example embodiments are not limited thereto.

In some example embodiments, the image processing unit 1030 and the control unit 1060 may be implemented by the same device and/or integrated in a single chip.

The apparatuses, units, modules, devices, and other components described herein may be implemented by hardware components. Examples of hardware components that may be used to perform the operations described in this application include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application may be implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used to describe the examples in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, a single-instruction single-data (SISD) multiprocessor, a single-instruction multiple-data (SIMD) multiprocessor, a multiple-instruction single-data (MISD) multiprocessor, and a multiple-instruction multiple-data (MIMD) multiprocessor.

The methods that perform the operations described in this application may be performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above may be written as computer programs, code segments, instructions or any combination thereof, for individually or collectively instructing or configuring the processor or computer to operate as a machine or special-purpose computer to execute the operations performed by the hardware components and the methods as described above. In one example, the instructions and/or software include machine code that is directly executed by the processor or computer, such as machine code produced by a compiler. In another example, the instructions or software include higher-level code that is executed by the processor or computer using an interpreter. Persons and/or programmers of ordinary skill in the art may readily write the instructions and/or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, may be recorded, stored, or fixed in or on one or more non-transitory computer-readable storage medium. Examples of a non-transitory computer-readable storage medium include at least one of read-only memory (ROM), programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to a processor or computer so that the processor or computer can execute the instructions.

While various example embodiments of the inventive concept have been described, it will be apparent to one of ordinary skill in the art that various changes in form and detail may be made thereto without departing from the spirit and scope of inventive concept as set forth in the claims.

What is claimed is:

1. A method for image processing comprising:
- obtaining a sensor image;
- performing a lens shading correction on the sensor image to obtain a first image;
- performing a weighted masking on the first image to obtain a second image; and
- performing an automatic white balance processing on the second image to obtain a third image,
- wherein the performing the weighted masking includes:
- determining whether the first image is in a transitional state; and
- selecting a weighted mask based on a result of the determination, wherein the weighted mask includes a plurality of weights, and each of the plurality of weights corresponds to one of a plurality of pixels in the first image.

2. The method of claim 1,
- wherein the sensor image includes a plurality of continuous sensor images, and the lens shading correction, the weighted masking and the automatic white balance processing are performed on each of the sensor images to obtain the first images, the second images and the third images corresponding to respective ones of the sensor images.

3. The method of claim 1, wherein the performing the weighted masking further includes:
- generating the second image based on the weighted mask and the first image, wherein each pixel value of the second image is based on a respective weight among the weights in the weighted mask and a pixel value of a respective pixel in the first image.

4. The method of claim 3, further includes:

obtaining a correlated color temperature of the third image through the automatic white balance processing, wherein the lens shading correction performed on a current sensor image is based on the correlated color temperature of the third image corresponding to a previous sensor image.

5. The method of claim 4, wherein the determining whether the first image is in the transitional state includes:

determining whether a difference of estimated values of a correlated color temperature between the first image corresponding to a current sensor image and the first image corresponding to a previous sensor image is greater than a threshold, wherein the estimated value of the correlated color temperature of the first image corresponding to the current sensor image is the correlated color temperature of the third image corresponding to the previous sensor image;

determining that the first image corresponding to the current sensor image is in the transitional state, in response to the difference being greater than the threshold; and determining that the first image corresponding to the current sensor image is in a stable state, in response to the difference being not greater than the threshold.

6. The method of claim 5, wherein the generating the second image includes:

determining a transition weighted mask in response to determining that the first image is in the transitional state, and generating the second image based on the transition weighted mask and the first image, wherein a value of each of the weights in the transition weighted mask is between 0 and 1; and selecting a stable weighted mask in response to determining that the first image is in the stable state, and generating the second image based on the stable weighted mask and the first image, wherein a value of each of the weights in the stable weighted mask is 1.

7. The method of claim 6, wherein the transition weighted mask of the first image corresponding to the current sensor image is determined to be different from the transition weighted mask of the first image corresponding to the previous sensor image, and wherein a weight, corresponding to a peripheral pixel of the first image, in the transition weighted mask of the first image corresponding to the current sensor image, is greater than a weight, corresponding to a respective pixel, in the transition weighted mask of the first image corresponding to the previous sensor image.

8. The method of claim 6, wherein the determining the transition weighted mask includes:

selecting a weighted mask corresponding to the difference of the estimated values.

9. The method of claim 8, wherein, as the difference of the estimated values becomes greater, the value of the weight, corresponding to a peripheral pixel of the first image, in the transition weighted mask becomes smaller.

10. An electronic device comprising:

a sensor module configured to obtain a sensor image; and a processor configured to:

perform a lens shading correction on the sensor image to obtain a first image;

perform a weighted masking on the first image to obtain a second image; and perform an automatic white balance processing on the second image to obtain a third image, wherein the processor is further configured to:

determine whether the first image is in a transitional state; and select a weighted mask based on a result of the determination, wherein the weighted mask includes a plurality of weights, and each of the plurality of weights corresponds to one of a plurality of pixels in the first image.

11. The electronic device of claim 10, wherein the sensor image includes a plurality of continuous sensor images, and the processor performs the lens shading correction, the weighted masking and the automatic white balance processing on each of the sensor images to obtain the first images, the second images and the third images corresponding to respective ones of the sensor images.

12. The electronic device of claim 10, wherein the processor is further configured to:

generate the second image based on the weighted mask and the first image, wherein each pixel value of the second image is based on a respective weight among the weights in the weighted mask and a pixel value of a respective pixel in the first image.

13. The electronic device of claim 12, wherein the processor is further configured to obtain a correlated color temperature of the third image through the automatic white balance processing, wherein the lens shading correction performed on a current sensor image is based on the correlated color temperature of the third image corresponding to a previous sensor image.

14. The electronic device of claim 13, wherein the processor is further configured to:

determine whether a difference of estimated values of a correlated color temperature between the first image corresponding to a current sensor image and the first image corresponding to a previous sensor image is greater than a threshold, wherein the estimated value of the correlated color temperature of the first image corresponding to the current sensor image is the correlated color temperature of the third image corresponding to the previous sensor image;

determine that the first image corresponding to the current sensor image is in the transitional state, in response to the difference being greater than the threshold; and determine that the first image corresponding to the current sensor image is in a stable state, in response to the difference being not greater than the threshold.

15. The electronic device of claim 14, wherein the processor is further configured to:

determine a transition weighted mask in response to determining that the first image is in the transitional state, and generate the second image based on the transition weighted mask and the first image, wherein a value of each of the weights in the transition weighted mask is between 0 and 1; and select a stable weighted mask in response to determining that the first image is in the stable state, and generate the second image based on the stable weighted mask and the first image, wherein a value of each of the weights in the stable weighted mask is 1.

16. The electronic device of claim 15, wherein the transition weighted mask of the first image corresponding to the current sensor image is determined to be different from the transition weighted mask of the first image corresponding to the previous sensor image, and wherein a weight, corresponding to a peripheral pixel of the first image, in the transition weighted mask of the first image corresponding to the current sensor image, is greater than a weight, corresponding to a respective pixel, in the transition weighted mask of the first image corresponding to the previous sensor image.

17. The electronic device of claim 15, wherein the processor is further configured to, select a weighted mask corresponding to the difference of the estimated values.

18. The electronic device of claim 17, wherein, as the difference of the estimated values becomes greater, the value of the weight, corresponding to a peripheral pixel of the first image, in the transition weighted mask becomes smaller.

19. A non-transitory computer-readable storage medium storing instructions that, when executed by a processor, cause the processor to execute the method of claim 1.

* * * * *